United States Patent [19]

Marut

[11] 4,079,431
[45] Mar. 14, 1978

[54] INDICIA DISPLAY AND AUDIO STORAGE CASSETTE

[76] Inventor: Victor Marut, 3N 474 Linda La., Addison, Ill. 60101

[21] Appl. No.: 706,174

[22] Filed: Jul. 19, 1976

[51] Int. Cl.$^2$ ............................................. G11B 23/06
[52] U.S. Cl. .................................. 360/132; 116/114 J
[58] Field of Search ...................... 360/137, 132, 1, 2, 360/3; 242/57; 352/92, 236; 116/67 A, 124 R, 114 J, 133

[56] References Cited

U.S. PATENT DOCUMENTS

| | | | |
|---|---|---|---|
| 2,822,425 | 2/1958 | Hicks | 360/1 |
| 2,918,662 | 12/1959 | Cox | 360/1 |
| 3,020,360 | 2/1962 | Gratian | 360/1 |
| 3,472,970 | 10/1969 | Basseches | 360/1 |
| 3,553,851 | 1/1971 | Paige | 360/1 |
| 3,623,450 | 11/1971 | Siller | 116/133 |
| 4,001,891 | 1/1977 | Held | 116/133 |

Primary Examiner—Jay P. Lucas
Attorney, Agent, or Firm—Robert D. Farkas

[57] ABSTRACT

This disclosure pertains to a cartridge containing an endless magnetic tape having recorded information in combination with a second spool of endless tape having written information thereon. The two spools are linked together so that both tapes are synchronously driven by a conventional tape player adapted to operate the magnetic spool alone. The user views the information on the indicating tape while listening to the playback of the recorded signal by utilizing a magnifying lense adapted to selectively enlarge each longitudinal track of written information, such as lyrics, corresponding to the longitudinal tracks of related signal, such as music.

10 Claims, 3 Drawing Figures

INDICIA DISPLAY AND AUDIO STORAGE CASSETTE

BACKGROUND OF THE INVENTION

1. The Field of the Invention

This invention relates to cartridges containing endless tapes adapted with indicia readout apparatus.

2. Description of the Prior Art

The prior art abounds with cartridges of a variety of styles including endles tapes adapted to run between two independent spools therein. The tapes are adapted with magnetically sensitive material and are utilized in the recording and playback of a variety of electronic signals necessitating the use of magnetically operated recording heads and magnetically sensitive pickup heads. The prior art is devoid of apparatus adapted to simultaneously display written information on a tape strip synchronously driven with the magnetic tape contained within a common housing.

SUMMARY OF THE INVENTION

A primary object of the instant invention is to provide a tape cartridge which permits viewing of information whilst the user is listening to synchronous sounds recorded on a separate magnetic tape strip.

Another object is to provide a tape cartridge system which permits both magnetic and indicia bearing tapes to be synchronously driven.

Still another object is to provide magnification means to enlarge the indicia on selective longitudinal tracks of the indicia bearing tape.

Yet another object is to provide a sufficient light to enable the user to conveniently view the moving indicia bearing strip in darkened areas.

A further object is to provide a unitary housing containing a magnetic tape and an indicia bearing strip adapted to be used on conventional recording and playback devices without any modifications thereto.

This invention relates to a tape cartridge which is inserted into a conventional cartridge playback unit reproducing information recorded on the magnetically encoded endless tape whilst simultaneously providing a second non-magnetically operated tape adapted with indicia which may be viewed during the playback of the encoded magnetic signals. In this manner, printed words may be viewed as lyrics accompanying the magnetically encoded music, or musical notations such as chords or guitar fingering instructions enabling the user to musically accompany the prerecorded magnetic signals, or as a training aid for the deaf, providing thereby visual as well as acousto-vibrational messages. Both tape bearing spools are synchronously driven yielding equal linear tape speeds utilizing a belt to drive the indicia bearing tape from the driven magnetically encoded tape. Related magnetically encoded information and indicia are simultaneously presented to a magnetic pickup head and a magnifying lense, adapted to facilitate viewing.

These objects, as well as other objects of this invention, will become readily apparent after reading the following description of the accompanying drawings.

DESCRIPTION OF THE PREFERRED EMBODIMENT

The structure and method of fabrication of the present invention is applicable to a tape cartridge having two distinct spools of endless tape therein. One tape is the equivalent of a conventional magnetic recording tape containing information magnetically recorded thereon. The second tape containing printed information is adapted to be viewed by the user of the device. Both tapes have the identical endless length. The cartridge consists of a longitudinal rectangularly shaped housing. The portion of the magnetic tape which comes into contact with the playback unit's tape propelling means is exposed through slots or openings in one of the side surfaces. The opposite side surface of equal or greater height has a longitudinal opening permitting visual access to the indicia bearing tape which passes alongside. The housing may have a greater height in the area of the indicia bearing tape spool and related openings than the height of the housing in the area surrounding the magnetically encoded tape strip, enabling the user thereby to more conveniently view the indicia. Both spools are linked together by means of a belt intimately associated to a circumferential surface of equal diameter insuring thereby equal tape speeds. The indicia viewing slot is covered by a rectangular convex lense. The free ends of the lense have tabs projecting parallel to the optic path. Both tabs have two detenting protrusions which are adapted to engage pairs of lense positioning recesses located on the sides of the housing adjacent the side having the indicia viewing slot. Most magnetic tape strips have parallel longitudinal tracks of magnetic information encoded thereon. Conventional playback apparatus shifts the playback head from track to track enabling the user to select a desired track level. The indicia bearing strip could have an equivalent number of parallel indicia bearing tracks which must be selectively viewed. The user raises and lowers the focal axis of the magnifying lense to select the desired track level of indicia corresponding to the employed track level of magnetically encoded signals. The user moves the detenting projections into selected recesses sensibly adjusting thereby the focal axis of the magnifying lense to correspond with the indicia track level desired.

In some applications, the indicia bearing strip may be located in a darkened area. Miniature incandescent bulbs may be located near each end of the magnifying lense so as to provide illumination directly on the surface bearing the indicia of the indicia bearing tape.

Figure 1:
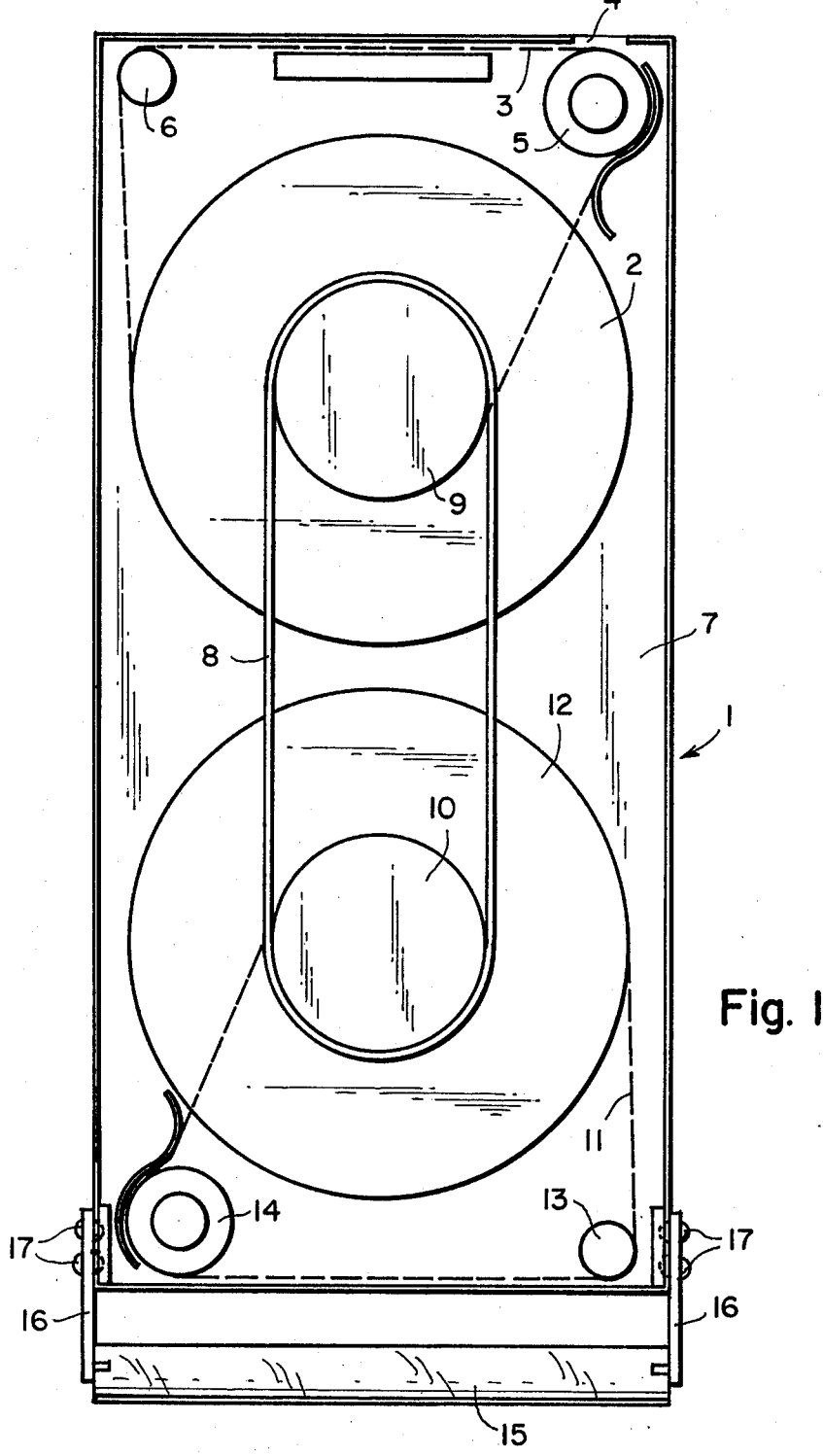
FIG. 1 is a plan view of a unitary housing without a lid and an externally mounted magnifying lense.

Now referring to the Figures, and more particularly to the embodiment illustrated in FIG. 1 showing the tape cartridge housing 7 of the indicating apparatus 1 having a spool of magnetic tape 2 rotatably affixed therein. A portion of the tape 3 is shown passing through slot 4 where it contacts the mechanisms, not shown, of the playback unit. Roller 5, when in contact with the tape driving capstan, not shown, propells the tape away from idler 6 towards roller 5. Spool 12 bears tape strip 11 which has visual information on the outermost surface thereof. Tape 11 is shown being positioned around idler 13, continuing on around roller 14. Magnifying lense 15 is shown having tabs 16 connected at the free ends thereof. The tabs have detenting protrusions 17 which secure the magnifying bar to the side edges of the cartridge 7. Belt 8 is shown rotatably connecting tape spools 2 and 12 by partially wrapping around circumferential surfaces 9 and 10 affixed thereto.

Figures 2, 3:
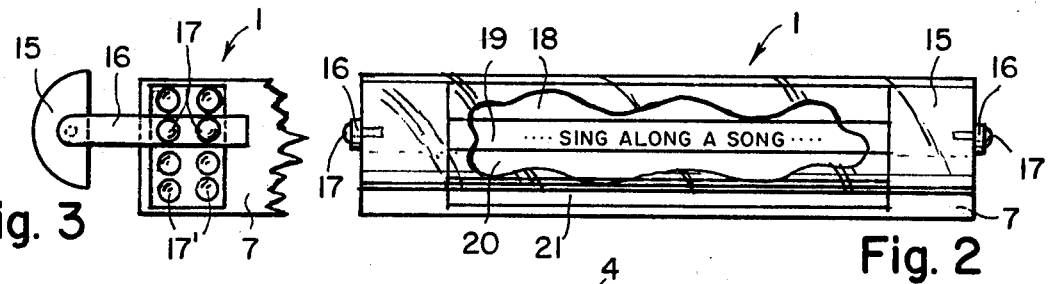
FIG. 2 is a front elevation view of the lense and housing as shown in FIG. 1.
FIG. 3 is a side elevation view of the lense and housing as shown in FIG. 1.

FIG. 2 shows the front side of the cartridge 7 as shown in FIG. 1 partially obliterated by magnifying lense 15. The indicia is confined alongst parallel longitudinal rows 18, 19, 20, and 21 bearing discreet and separate indicia therein. Magnifying lense 15 is shown covering the second row depicted by numeral 19, secured in that position by tabs 16. The information depicted on row 19 will be magnified at a maximum when magnifying lense 15 is positioned as shown. Lights may be installed at the ends of tabs 16 adjacent the mating ends of magnifying lense 15.

FIG. 3 shows a side elevation view of the magnifying lense 15. Tab 16 is shown securing the ends of magnifying lense 15 to a track of indicia corresponding to the row identified by numeral 19 as shown in FIG. 2. Recesses 17' accept detenting protrusions 17 as shown in FIG. 1 to enable the user to select a desired position for magnifying lense 15.

One of the advantages is a tape cartridge which permits viewing of information whilst the user is listening to synchronous sounds recorded on a separate magnetic tape strip.

Another advantage is a tape cartridge system which permits both magnetic and indicia bearing tapes to be synchronously driven.

Still another advantage is magnification means to enlarge the indicia on selective longitudinal tracks of the indicia bearing tape.

Yet another advantage is a sufficient light to enable the user to conveniently view the moving indicia bearing strip in darkened areas.

A further advantage is a unitary housing containing a magnetic tape and an indicia bearing strip adapted to be used on conventional recording and playback devices without any modifications thereto.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appended claims.

The embodiment of the invention in which an exclusive privilege or property is claimed are defined as follows:

1. An indicating apparatus comprising a housing adapted to contain an endless magnetically susceptible strip born by a first reel and a first idler, an endless indicia bearing strip born by a second reel and a second idler, driving means to drive said magnetically susceptible strip and said indicia bearing strip at a synchronous rate, said magnetically susceptible strip and said indicia bearing strip adapted to have substantially identical peripheral lengths, viewing means adapted to permit viewing of said indicia bearing strip through a first opening in said housing, transport means to transport said magnetically susceptible strip utilizing a second opening in said housing, coupling means adapted to permit magnetic coupling to said magnetically susceptible strip.

2. The indicating apparatus as claimed in claim 1 wherein said magnetically susceptible strip is magnetically encoded in a number more than one of parallel longitudinal tracks extending parallel to the edges of said magnetically susceptible strip, said indicia bearing strip adapted to have indicia contained within tracks equal in number to said number more than one.

3. The indicating apparatus as claimed in claim 1 wherein said indicia bearing strip contains indicia visually related to the intelligence magnetically encoded upon said magnetically susceptible strip.

4. The indicating apparatus as claimed in claim 1 further comprising a magnifying lense adapted to engage said housing, means to magnify the outermost surface of said indicia bearing strip appearing through said first opening.

5. The indicating apparatus as claimed in claim 4 further comprising means to adjust the focal axis of said magnifying lense to intersect said indicia bearing strip at varying selected points intermediate the longitudinal edges thereof.

6. The indicating apparatus as claimed in claim 4 further comprising illuminating means adapted to provide illumination on said outermost surface.

7. The indicating apparatus as claimed in claim 1 wherein said driving means comprises an endless driving belt interconnecting said first and said second reels.

8. The indicating apparatus as claimed in claim 1 wherein said transport means are adapted to engage said first idler and a capstan turning at selected rotational speeds having said magnetically susceptible strip interposed therebetween.

9. The indicating apparatus as claimed in claim 1 wherein the width of said indicia bearing strip is unequal to the width of said magnetically susceptible strip.

10. The indicating apparatus as claimed in claim 1 wherein said indicia bearing strip has indicia thereupon depicted in a first quantity of horizontal tracks extending parallel to a longitudinal edge thereof, said magnetically susceptible strip having varying individualized magnetically encoded information tracks encoded in a second quantity of horizontal tracks thereupon, said first quantity unequal to said second quantity.

* * * * *